US007010751B2

(12) United States Patent
Shneiderman

(10) Patent No.: US 7,010,751 B2
(45) Date of Patent: Mar. 7, 2006

(54) METHODS FOR THE ELECTRONIC ANNOTATION, RETRIEVAL, AND USE OF ELECTRONIC IMAGES

(75) Inventor: Ben A. Shneiderman, Washington, DC (US)

(73) Assignee: University of Maryland, College Park, College Park, MD (US)

( * ) Notice: Subject to any disclaimer, the term of this patent is extended or adjusted under 35 U.S.C. 154(b) by 542 days.

(21) Appl. No.: 09/976,362

(22) Filed: Oct. 15, 2001

(65) Prior Publication Data

US 2002/0054059 A1 May 9, 2002

Related U.S. Application Data

(63) Continuation of application No. PCT/US01/04963, filed on Feb. 16, 2001.

(60) Provisional application No. 60/197,971, filed on Apr. 17, 2000, now abandoned, provisional application No. 60/183,588, filed on Feb. 18, 2000, now abandoned.

(51) Int. Cl.
*G06F 3/00* (2006.01)
*G06F 7/00* (2006.01)

(52) U.S. Cl. ............... 715/764; 715/769; 715/968; 715/512; 707/4

(58) Field of Classification Search ............ 345/700, 345/708, 751, 764, 769, 968; 715/104, 500, 715/512, 514, 700, 708, 716, 723–726, 751–759, 715/764, 769, 968, 731, 810

See application file for complete search history.

(56) References Cited

U.S. PATENT DOCUMENTS

| 5,142,662 A | | 8/1992 | Gump et al. ............. 395/100 |
| 5,241,671 A | * | 8/1993 | Reed et al. ............. 707/104.1 |
| 5,404,435 A | | 4/1995 | Rosenbaum ............. 395/147 |
| 5,452,416 A | * | 9/1995 | Hilton et al. ............. 715/783 |
| 5,493,677 A | | 2/1996 | Balogh et al. ............. 395/600 |

(Continued)

FOREIGN PATENT DOCUMENTS

EP 01006464 A2 6/2000

(Continued)

OTHER PUBLICATIONS

Jia Li., Catherine Plaisant, Ben Shneiderman, "Data Object and Label Placement for Information Abundant Visualizations" Workshop on New Paradigms in Information Visualization and Manipulation (NPIV'98), ACM, New York, 41-48, 1998.

(Continued)

*Primary Examiner*—Sy D. Luu
(74) *Attorney, Agent, or Firm*—Jeffrey I. Auerbach

(57) ABSTRACT

The present invention provides software for electronically annotating electronic images, such as drawings, photographs, video, etc., through the drag-and-drop of annotations from a pre-defined, but extendable, list. The annotations are placed at a user-selected X, Y location on the image, and stored in a searchable database. Thus, they can be searched in order to retrieve, organize, group, or display desired electronic images or collections of such images. The annotations may be text, images, sounds, etc. The invention provides a flexible, easy to learn, rapid, low error rate and satisfying interface for accomplishing such tasks.

26 Claims, 11 Drawing Sheets

U.S. PATENT DOCUMENTS

| | | | |
|---|---|---|---|
| 5,579,471 A | 11/1996 | Barber et al. | 395/326 |
| 5,581,682 A * | 12/1996 | Anderson et al. | 715/530 |
| 5,583,980 A * | 12/1996 | Anderson | 345/473 |
| 5,640,553 A | 6/1997 | Schultz | 395/605 |
| 5,680,636 A * | 10/1997 | Levine et al. | 715/512 |
| 5,689,717 A | 11/1997 | Pritt | 395/773 |
| 5,734,915 A * | 3/1998 | Roewer | 715/512 |
| 5,751,286 A | 5/1998 | Barber et al. | 345/348 |
| 5,757,466 A | 5/1998 | Lee et al. | 355/39 |
| 5,793,969 A * | 8/1998 | Kamentsky et al. | 709/213 |
| 5,845,288 A | 12/1998 | Syeda-Mahmood | 707/102 |
| 5,873,080 A | 2/1999 | Coden et al. | 707/3 |
| 5,899,999 A | 5/1999 | De Bonet | 707/104 |
| 5,911,139 A | 6/1999 | Jain et al. | 707/3 |
| 5,920,317 A * | 7/1999 | McDonald | 715/853 |
| 5,938,724 A * | 8/1999 | Pommier et al. | 709/205 |
| 6,014,581 A | 1/2000 | Whayne | 600/523 |
| 6,041,335 A * | 3/2000 | Merritt et al. | 715/512 |
| 6,085,185 A * | 7/2000 | Matsuzawa et al. | 707/2 |
| 6,111,586 A | 8/2000 | Ikeda et al. | 345/433 |
| 6,112,215 A | 8/2000 | Kaply | 707/507 |
| 6,128,446 A * | 10/2000 | Schrock et al. | 396/297 |
| 6,154,755 A | 11/2000 | Dellert et al. | 707/526 |
| 6,172,676 B1 | 1/2001 | Wood | 345/346 |
| 6,687,878 B1 * | 2/2004 | Eintracht et al. | 715/512 |

FOREIGN PATENT DOCUMENTS

| | | |
|---|---|---|
| EP | 00938227 A2 | 9/2000 |
| WO | WO00046695 A1 | 8/2000 |

OTHER PUBLICATIONS

John Lamping, Ramana Rao, and Peter Pirolli, "A Focus + Context Technique Based On Hyperbolic Geometry For Visualizing Large Hierarchies", Proceedings of ACM CHI95 Conference on Human Factors in Computing Systems, New York, 401-408, 1995.

John Unsworth, 11.0661 Image Annotation Software, 1998.

R. Chellappa, C.L. Wilson and S. Sirohey, "Human and Machine Recognition of Faces: A Survey" *Proceedings of the IEEE*, vol. 83, pp. 705-740, May 1995.

Rui, et al. (1999); Image Retrieval: "*Current Techniques Promising Directions and Open Issues*," http://citeseer.nj.nec.com/384715.html),.

Smith, J.R. et al., Tools and Techniques for Color Image Retrieval, IS&T/SPIE Proceedings vol. 2670, Storage & Retrieval for Image for Image databases IV (1995).

VisualSEEk Computer Program developed by Dr. John R. Smith, Columbia University (http://www.ctr.columbia.edu/~jrsmith/html/pubs/acmmm96/acm.html).

GIADAscan internet printout (1996).

FAO Photofile Archive.

(PhotoFinder 2.2 software developed by Dr. Ben A. Shneiderman (http://www.cs.umd.edu/hcil/photolib/).

Allan Kuchinsky, Celine Pering, Michael L. Creech, Dennis Freeze, Bill Serra, Jacek Gwizdka, "FotoFile: A Consumer Multimedia Organization and Retrieval System", *Proceedings of ACM CHI99 Conference on Human Factors in Computing Systems*, 496-503, 1999).

Ben A. Shneiderman, "User Interfaces for Photo Libraries: Facilitating Web-based Story Telling with Annotations and Captions," http://www.cs.umd.edu/users/ben/.

Ben Shneiderman et al., Direct Annotation: A Drag-and-Drop Strategy for Labeling Photos (2000).

Bill N. Schilit, Gene Golovchinsky, and Morgan N. Price, "Beyond Paper: Supporting Active Reading with Free Form Digital Ink Annotations," *Proceedings of ACM CHI 98 Conference on Human Factors in Computing Systems*, v.1 249-256, 1998.

Chang, S.-F. et al. (1997), "Visual Information Retrieval from Large Distributed On-line Repositories," http://citeseer.nj.nec.com/change97visual.html).

E. Imhof, "Positioning Names on Maps", *The American Cartographer*, 2, 128-144, 1975.

Internet cite http://chaos1.hypermart.net/egypt/tae.html.

J. Christensen, J. Marks, and S. Shieber, "An Empirical Study Of Algorithms For Point-Feature Label Placement", *ACM Transactions on Graphics* 14, 3, 203-232, 1995.

J. S. Doerschler and H. Freeman, "A Rule-Based System For Dense-Map Name Placement", *Communications Of The ACM* 35, 1, 68-79, 1992.

J. Stewart, B. B. Bederson, & A. Druin, "Single Display Groupware: A Model for Co-Present Collaboration.", *Proceedings of ACM CHI99 Conference on Human Factors in Computing Systems*, 286-293, 1999.

Jean-Daniel Fekete Catherine Plaisant, "Excentric Labeling: Dynamic Neighborhood Labeling for Data Visualization," *Proceedings of ACM CHI99 Conference on Human Factors in Computing Systems*, 512-519, 1999.

* cited by examiner

METHODS FOR THE ELECTRONIC ANNOTATION, RETRIEVAL, AND USE OF ELECTRONIC IMAGES

CROSS-REFERENCE TO RELATED APPLICATIONS

This application is a continuation of PCT/US01/04963 filed Feb. 16, 2001 and claims priority to U.S. patent applications Ser. Nos. 60/197,971 (filed Apr. 17, 2000, now abandoned) and 60/183,588 (filed Feb. 18, 2000, now abandoned), each of which applications is herein incorporated by reference in its entirety.

FIELD OF THE INVENTION

The present invention relates to software for accomplishing the computer-facilitated annotation of electronic images, as well as the retrieval and use of such annotated images.

BACKGROUND OF THE INVENTION

Drawings, sketches, artwork, photographs, and other images have long been recognized to have significant commercial and/or personal value. Paradoxically, as such images age, they become both more valuable and less valuable. Their increased value reflects their success in capturing events, emotions, people, objects, achievements, etc. that have attain enhanced personal, historical or commercial significance over the passage of time. The paradoxical diminution of their value reflects the inexorable loss of information regarding the people, events, or scenes shown in the images that occurs when those having actual knowledge of the depicted images become unavailable or die. This phenomenon, as applied to personal images (e.g., photographs, etc.), has been referred to as the "Personal Photo Paradox" (or "$P^3$").

One means for addressing the paradoxical diminution in the value of aging images is to organize the images into scrapbooks or albums, in which the individual images are captioned. Adding captions to photographs is, however, a time-consuming and error prone task even for professional photographers, editors, librarians, curators, and scholars. In many professional applications, photographs are worthless unless they are accurately described by date, time, location, photographer, title, recognizable people, etc. Additional descriptions may include details about the mechanics of the photograph (for example, film type, print size, aperture, shutter speed, owner, copyright information) and/or its contents (keywords from controlled vocabularies, topics from a hierarchy, free text descriptions, etc.). In light of the time required to add such captions, amateur photographers rarely systematically arrange or notate their collections, except for an occasional handwritten note on the back of a photograph or an envelope containing a collection of photographs.

For those who are serious about adding annotations, the common computer-based approach is to use database programs, such as Microsoft® Access®, that offer "form fill-in" or "free" text boxes and then store the information in a database. Data entry is typically done by typing, but many systems permit certain attribute values for some fields (for example, black & white or color film) to be selected by the individual keeping the collection. Of course, simpler tools that provide free-form input, such as word processors, spreadsheets, and other tools are used in many situations. Captions and annotations are often displayed near a photograph on screen displays, web pages, and printed versions (see, e.g., U.S. Pat. Nos. 6,111,586 (Issued Aug. 29, 2000); 5,873,080 (Issued Feb. 16, 1999); 5,493,677 (Issued Feb. 20, 1996); 5,404,435 (Issued Apr. 4, 1995); 5,142,662 (Issued Aug. 25, 1992) and by PCT Application WO00046695A1 (Published Aug. 10, 2000) and European Patent Applications EP00938227A3 (Published Sep. 6, 2000) and EP01006464A2 (Published Jun. 7, 2000). Software packages (Kodak PhotoEasy®, MGI PhotoSuite®, Aladdin Image AXS®, etc.) and web sites (Kodak's photonet, Gatherround.com, shutterfly, etc.) offer modest facilities to typing in annotations and searching descriptions.

As photograph library sizes increase, the need and benefit of annotation and search capabilities grows. The need to rapidly locate photographs of, for example, Bill Clinton meeting with Boris Yeltsin at a European summit held in 1998, is strong enough to justify substantial efforts in many news agencies. More difficult searches such as images depicting "agriculture in developing nations" are harder to satisfy, but many web and database search tools support such searches (Lycos, Corbis, etc.). Query-By-Image-Content from IBM, is one of many projects that use automated techniques to analyze image. Computer vision techniques can be helpful in finding photographs by color (sunsets are a typical example), identifying features (corporate logos or the Washington Monument), or textures (such as clouds or trees), but a blend of automated and manual techniques may be preferable. Approaches to the non-textual or "content-based" annotation of images are described in U.S. Pat. Nos. 5,911,139 (Issued Jun. 8, 1999), 5,899,999 (Issued May 4, 1999), and 5,579,471 (Issued Nov. 26, 1996) and PCT Applications WO09935596A1 (Published Jul. 15, 1999), WO09931605A1 (Published Jun. 24, 1999). The non-textual searching of image files is discussed by Rui, et al. (1999; "Image Retrieval: "Current Techniques Promising Directions and Open Issues"), and by Chang, S.-F. et al. (1997), "Visual Information Retrieval from Large Distributed On-line Repositories". Face recognition research offers hope for automated annotation, but commercial progress is slow (R. Chellappa, C.L. Wilson and S. Sirohey, "Human and Machine Recognition of Faces: A Survey" *Proceedings of the IEEE*, Vol. 83, pp. 705–740, May 1995; Allan Kuchinsky, Celine Pering, Michael L. Creech, Dennis Freeze, Bill Serra, Jacek Gwizdka, "FotoFile: A Consumer Multimedia Organization and Retrieval System", *Proceedings of ACM CHI99 Conference on Human Factors in Computing Systems*, 496–503, 1999).

The annotation of photographs is a variation on previously explored problems such as annotation on maps (E. Imhof, "Positioning Names on Maps", *The American Cartographer,* 2, 128–144, 1975; J. Christensen, J. Marks, and S. Shieber, "An Empirical Study Of Algorithms For Point-Feature Label Placement", *ACM Transactions on Graphics* 14, 3, 203–232, 1995; J. S. Doerschler and H. Freeman, "A Rule-Based System For Dense-Map Name Placement", *Communications Of The ACM* 35, 1, 68–79, 1992) in which the challenge is to place city, state, river, or lake labels close to the features. There is a long history of work on this problem, but new possibilities emerge because of the dynamics of the computer screen. Such efforts, however, are fundamentally different from those involved in the annotation of photographs, video, and other electronic images in which the image aspects (i.e., the objects, people scenes, depictions, etc. that are contained within an electronic image) are inherently unrelated to one another. Maps (and electronic timelines, are X,Y (or, in the case of timelines, X) representations of a surface or construct in which the relative placements of all desired annotations are determined solely by the scale of the image and the X,Y (or X) coordinate of its center, rather than by inspection and analysis of the image. The annotation of maps and timelines is possible using prior art methods because their image aspects are inherently related to one another. Annotation is usually seen as an authoring process conducted by specialists and users only chose whether to show or hide annotations. Variations on annotation also come from the placement of labels on markers in information visualization tasks such as in tree structures, such in the hyperbolic tree (John Lamping, Ramana Rao, and Peter Pirolli, "A Focus + Context Technique Based On Hyperbolic Geometry For Visualizing Large Hierarchies", Proceedings of ACM CHI95 Conference on Human Factors in Computing Systems, New York, 401–408, 1995) or in medical histories, such as LifeLines (Jia Li., Catherine Plaisant, Ben Shneidernian, "Data Object and Label Placement for Information Abundant Visualizations" *Workshop on New Paradigms in Information Visualization and Manipulation* (NPIV'98), ACM, New York, 41–48, 1998).

Previous work on electronic image annotation focused on the writing of computer programs to make label placements that reduced overlaps (Mark D. Pritt, "Method and Apparatus for The Placement of Annotations on A Display without Overlap", U.S. Pat. No. 5689717, 1997), but there are many situations in which it is helpful for users to place labels manually, much like a post-it® note, on documents, photographs, maps, diagrams, webpages, etc. Annotation of paper and electronic documents by hand is also a much-studied topic with continuing innovations (Bill N. Schilit, Gene Golovchinsky, and Morgan N. Price, "Beyond Paper: Supporting Active Reading with Free Form Digital Ink Annotations," *Proceedings of ACM CHI 98 Conference on Human Factors in Computing Systems*, v.1 249–256, 1998). While many systems allow notes to be placed on a document or object, the demands of annotating personal photograph libraries are worthy of special study (J Kelly Lee and Dana Whitney Wolcott, "Method of Customer Photoprint Annotation", U.S. Pat. No. 5757466, 1998). Personal photograph libraries are considered to represent a special case because users are concentrating on the photographs (and may have a low interested in the underlying technology), are concerned about the social aspects of sharing photographs, and are intermittent users. They seek enjoyment and have little patience for form filling or data entry. Personal photograph libraries may have from hundreds to tens of thousands of photographs, and organization is, to be generous, haphazard. Photographs are sometimes in neat albums, but more often put in a drawer or a shoebox. While recent photographs are often on top, shuffling through the photographs often leaves them disorganized. Some users will keep photographs in the envelopes they got from the photography store, and more organized types will label and order them. The annotating of such personal images is such a time-consuming, tedious and error-prone data entry task that it discourages many archivists and librarians from maximizing the value of their image collections. As noted by Rui, et al. (1999), the perception subjectivity and annotation impreciseness of text-based image retrieval systems may cause unrecoverable mismatches in the later retrieval process. The problem is particularly significant for most owners of personal photograph libraries.

As digital cameras become widespread, users have had to improvise organization strategies using hierarchical directory structures, and typing in descriptive file and directory names to replace the automatically generated photograph file numbers. Some software packages (PhotoSuite, PhotoEasy, etc.) enable users to organize photographs into albums and create web pages with photographs, but annotation is often impossible or made difficult. Web sites such as Kodak's PhotoNet.com, AOL.com, Gatherround.com, etc. enable users to store collections of photographs and have discussion groups about the collections, but annotation is limited to typing into a caption field. The FotoFile software (Allan Kuchinsky, Celine Pering, Michael L. Creech, Dennis Freeze, Bill Serra, Jacek Gwizdka, "FotoFile: A Consumer Multimedia Organization and Retrieval System", *Proceedings of ACM CHI99 Conference on Human Factors in Computing Systems*, 496–503, 1999) is considered particularly relevant.

It is an objective of the present invention to provide a computer software program that permits both skilled and intermittent users the ability to annotate electronic images in a manner that is easy and accurate, and which permits the user or others to retrieve, organize, additionally annotate display and/or distribute such images as desired.

SUMMARY OF THE INVENTION

The present invention addresses the problem of annotating commercial and/or personal electronic images, by providing software that permits users to easily accomplish such annotation, through the drag-and-drop of annotations from a predefined, but extendable, list. The annotations are placed at an X, Y location on the image determined by the user, and stored in a searchable database. If the image is resized, the X, Y position of the center point of the label is proportionately adjusted. The annotations can be searched in order to retrieve, organize, group, or display desired electronic images or groups or collections of such images. The annotations may be text, images, logos, web pages, web links, sounds, etc. The invention provides a flexible, easy to learn, rapid, low error rate and satisfying interface for accomplishing such tasks.

In one embodiment, the software causes a scrolling list of annotations (such as personal names, dates, objects, events, etc.) to be displayed in response to a user action. The user may then access a desired annotation, "drag" it to a relevant site in the image and "drop" it into the image. In an alternative or conjunctive embodiment, the software may cause menus and submenus of annotations to be displayed. A desired annotation can be selected and dropped into a relevant site in the image. By allowing users to avoid the need for continually re-keying annotations (i.e., by dragging or selecting annotations from a list or menu and dropping them onto an image, the task of notating images can be made faster, easier, more reliable, and more appealing. Moreover, since the annotations are entered in a database, searching for all images associated with that annotation (e.g., photographs of a friend or family member) is dramatically simplified. The software of the present invention described herein comprises a user interface design and the database schema that supports such direct annotation. Once images have been annotated, they may be retrieved by merely selecting an annotation from a list of annotations, and may then collected, organized, displayed or distributed as desired.

In detail, the invention comprises a computer software-mediated method for annotating an image aspect of an electronic image, wherein the software:

(A) causes the electronic image containing the image aspect to be displayed to a user in a computer-generated interface;

(B) causes the interface to permit the user to access and query a searchable electronic database of textual annotation terms for an annotation term, and optionally permitting the user to add a desired annotation term to the database; and (C) causes an annotation of the database to become associated with the image aspect, such that:
  (1) the annotation, in response to a request by a user, is displayed positioned so as to permit a user to identify the associated image aspect in the displayed image;
  (2) the annotation association is stored in a second searchable electronic database so as to permit a user to retrieve the electronic image by querying the second electronic database for the annotation.

The invention additionally provides a computer software-mediated method for retrieving an electronic image containing a desired image aspect, wherein the image is stored in a computer-managed database of images, and wherein the image aspect is associated with an annotation, the association being stored in a searchable electronic database, the method comprising:

(A) querying the searchable electronic database for image aspects that are associated with the annotation;
(B) retrieving from the database an electronic image containing an image aspect associated with the annotation of step (A);
(C) displaying the retrieved electronic image and the annotation of step (A) to a user, in response to the user's request, such that the position of the annotation permits a user to identify the associated image aspect in the displayed image.

The invention further provides a method for retrieving collections of electronic images containing a desired image aspect or related family of image aspects, wherein the images are stored in a database of images, and wherein the image aspects are each associated with an annotation or related family of textual annotations, each such the association being stored in a searchable electronic database, the method comprising:

(A) querying the searchable electronic database for image aspects that are associated with the annotation or related family of annotations;
(B) retrieving from the database electronic images containing an image aspect or related family of image aspects associated with the annotation or related family of annotations of step (A);
(C) displaying the retrieved electronic images and the annotation(s) of step (A) to a user, in response to the user's request, such that the position of the annotation permits the user to identify the associated image aspect in each of the displayed images.

The invention additionally provides the embodiments of such computer software-mediated methods, wherein the computer is a personal computer, and the wherein the displayed image is displayed on the screen of a computer.

The invention additionally provides the embodiments of such computer software-mediated methods, wherein the software permits the user to associate the annotation with the image aspect by permitting the user to select, drag and drop the annotation to a user-selected location in the displayed electronic image.

The invention additionally provides the embodiments of such computer software-mediated methods, wherein the image is selected from the group consisting of a photograph, a writing, and a drawing.

The invention additionally provides the embodiments of such computer software-mediated methods wherein the image is a photograph and wherein the image aspect to be annotated is a person depicted in the photograph.

The invention further provides an electronic image stored in a database of images and displayed at the request of a user, the image containing a desired image aspect associated with a annotation, wherein, in response to a user's request, the image can be displayed with the annotation on the electronic image such that the position of the annotation permits the user to identify the associated image aspect in the displayed image.

The invention further provides one or more collections of electronic images each such image stored in a database of images and displayed at the request of a user, and each containing a desired image aspect or related family of image aspects, associated with an annotation or related family of textual annotations, wherein in response to a user's request, the images or collections thereof can be displayed with the annotation on the electronic images such that the position of the annotations permits a user to identify the associated image aspect in each displayed image.

The invention further provides a computer system specially adapted by software to store one or more electronic images or collections of such images, at the request of a user, and each containing a desired image aspect or related family of image aspects, associated with an annotation or related family of annotations, wherein in response to a user's request, the images or collections thereof can be displayed with the annotation on the electronic images such that the position of the annotation permits a user to identify the associated image aspect in each displayed image.

The invention additionally provides the embodiments of such computer software-mediated methods, images and collections of images, and computer systems, wherein each image contains more than one image aspect.

The invention additionally provides the embodiments of such computer software-mediated methods, images and collections of images, and computer systems, wherein such annotations are textual annotations.

The invention additionally provides the embodiments of such computer software-mediated methods, images and collections of images, and computer systems, wherein by identifying the position of the annotation, such computer software-mediated methods, images and collections of images, and computer systems permit a user to distinguish the annotated image aspect from inherently unrelated image aspect(s) that may be present in the displayed image(s).

BRIEF DESCRIPTION OF THE FIGURES

FIG. 3 shows the initial state of an electronic photographic image. FIG. 4 illustrates the list-selection of annotations. FIG. 5 shows the dragging of the annotation from the list and into the photograph. FIG. 6 shows the "dropping" of the annotation at a user selected site in the photograph. FIG. 7 shows the annotation of four individuals. FIG. 8 shows the ability of the software of the present invention to hide annotations upon user request.

DESCRIPTION OF THE PREFERRED EMBODIMENTS

The present invention relates to computer software for facilitating the annotation of one or more desired image aspects present in an electronic image and for employing such annotations to facilitate the retrieval, organization, collection, display or distribution of the associated electronic images.

As used herein, the term "computer" is intended to encompass any electronic device that accepts (i.e., store, generate, or process) image information in electronic form and manipulates such information for a result based upon a sequence of instructions. Thus, as used herein, the term computer is intended to encompass not only mainframe, web-based, personal and laptop computers, but also personal digital assistants (PDAs), digital cameras, televisions, video game systems (e.g., Playstation2®), video storage systems (e.g., TiVo®), and telephones, etc. that have the capability of accepting such information. The term "software" is intended to refer to a set or sequence that directs the manipulation of information by a computer.

The term "image aspect" as used herein is intended to refer to an individual, scene, object, event, design, etc. that is depicted in an electronic image. For example, the image aspects of a photograph of people include the depicted individuals (singly, e.g, "John Doe," or collectively, e.g., "Lecture Attendees"), their location, etc.

The term "electronic image," as used herein is intended to include photographs, video, drawings, writings, webpages, paintings, holographic images, cartoons, sketches, renderings, etc. that can be stored electronically.

The term "annotation" the association of text (including a textual hyperlink) to an image aspect of an image, such that the image aspect can be retrieved, collected, displayed or distributed using the annotation. The software of the present invention can optionally display or hide some or all annotations in response to the instructions of a user.

Image Annotation

Figure 3:
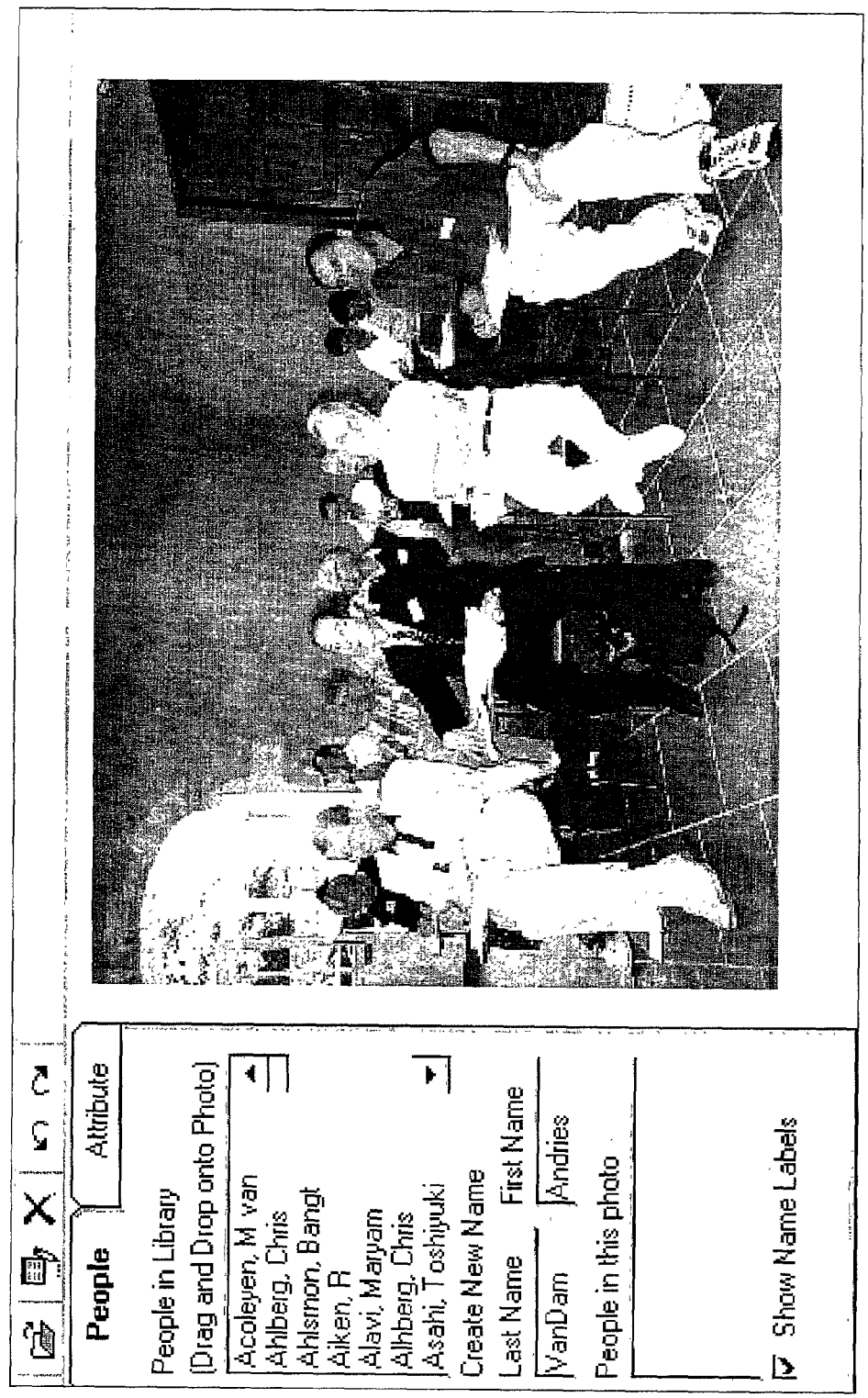
FIGS. 3–8 illustrate the user interface of the software of the present invention.
Figure 4:
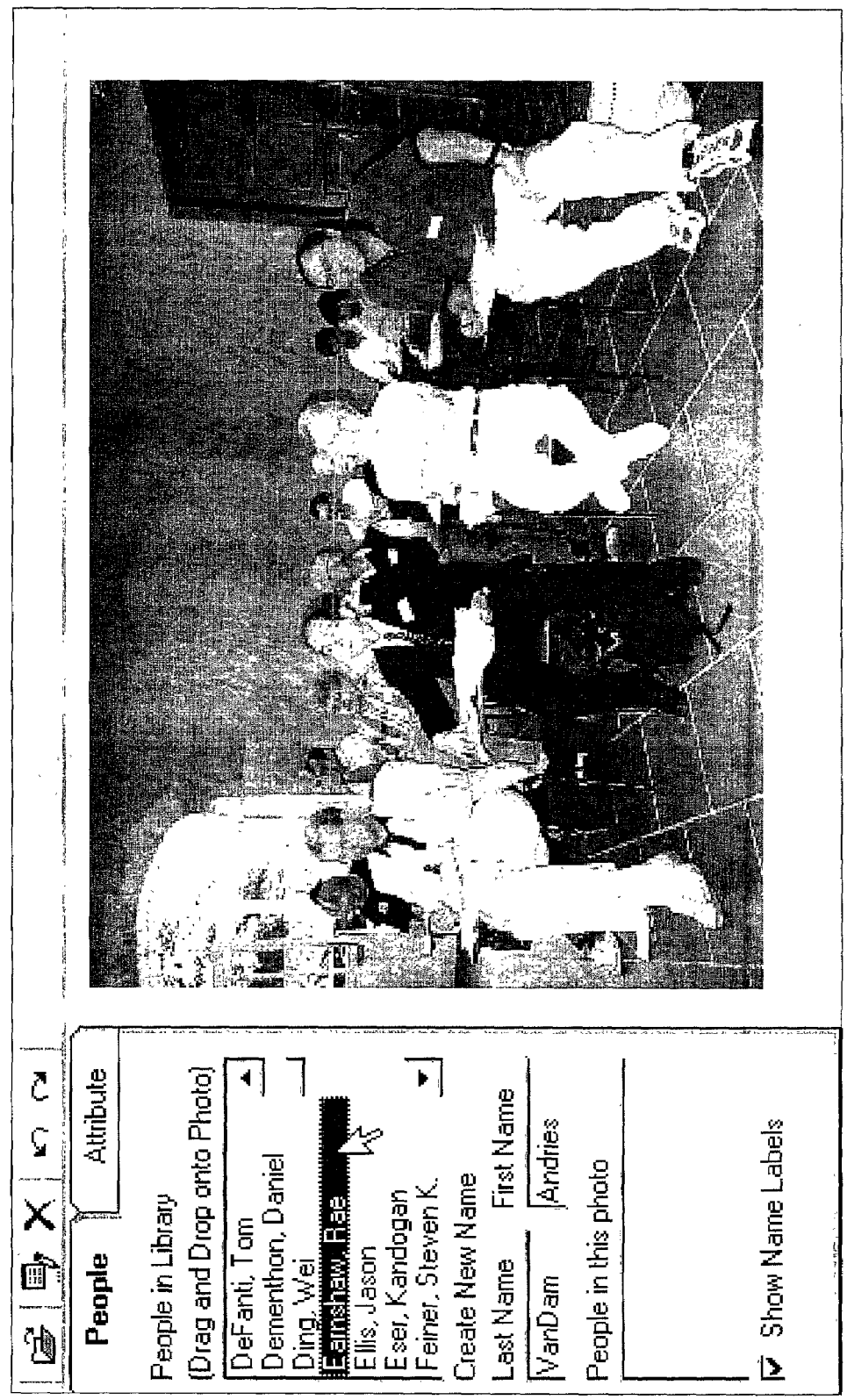
Figure 5:
Figure 6:
Figure 6:
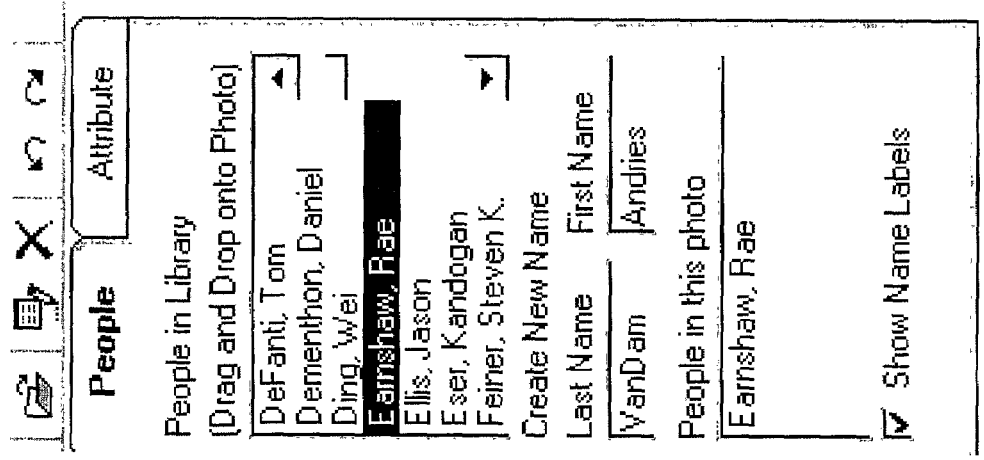
Figure 7:
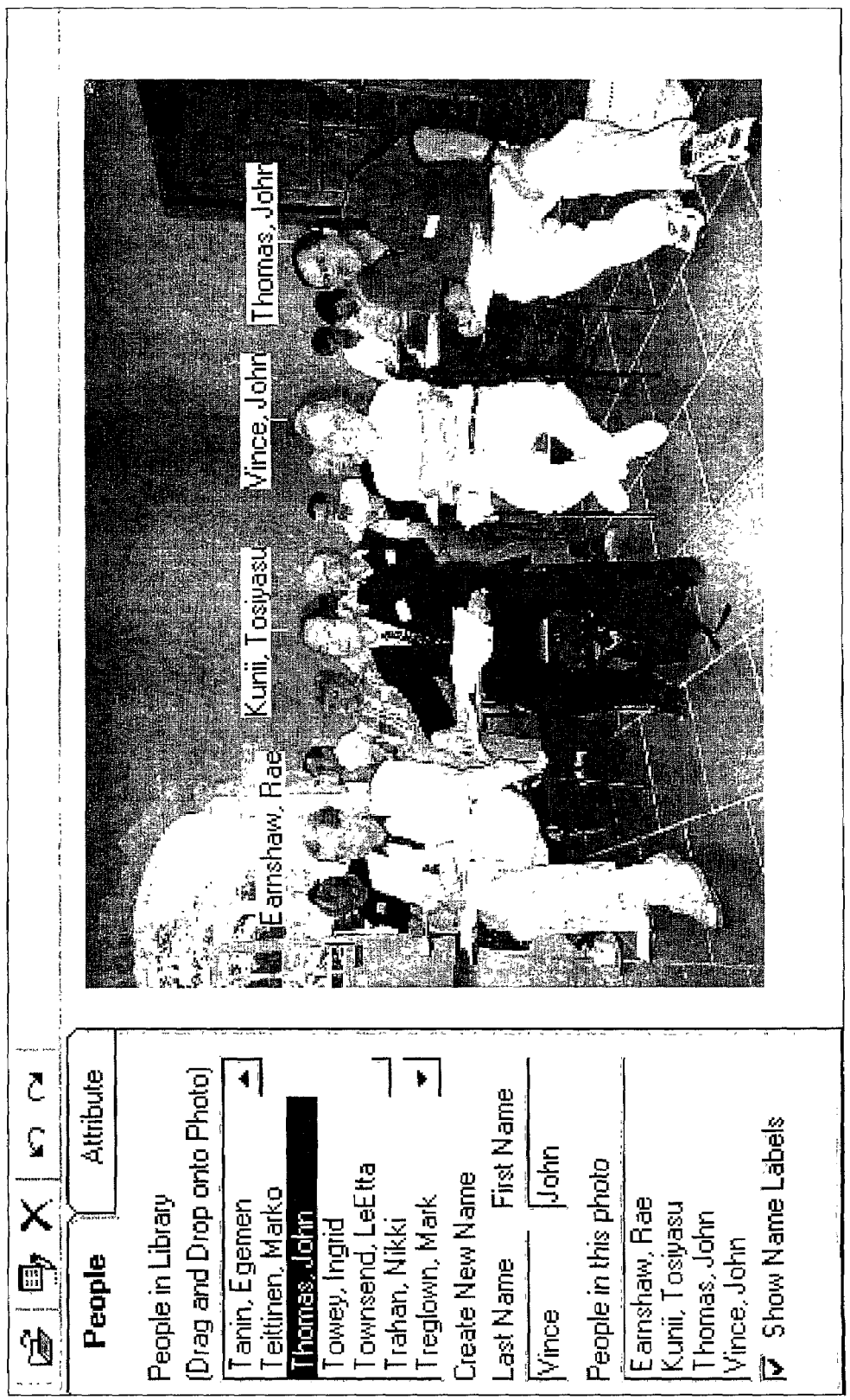
Figure 8:
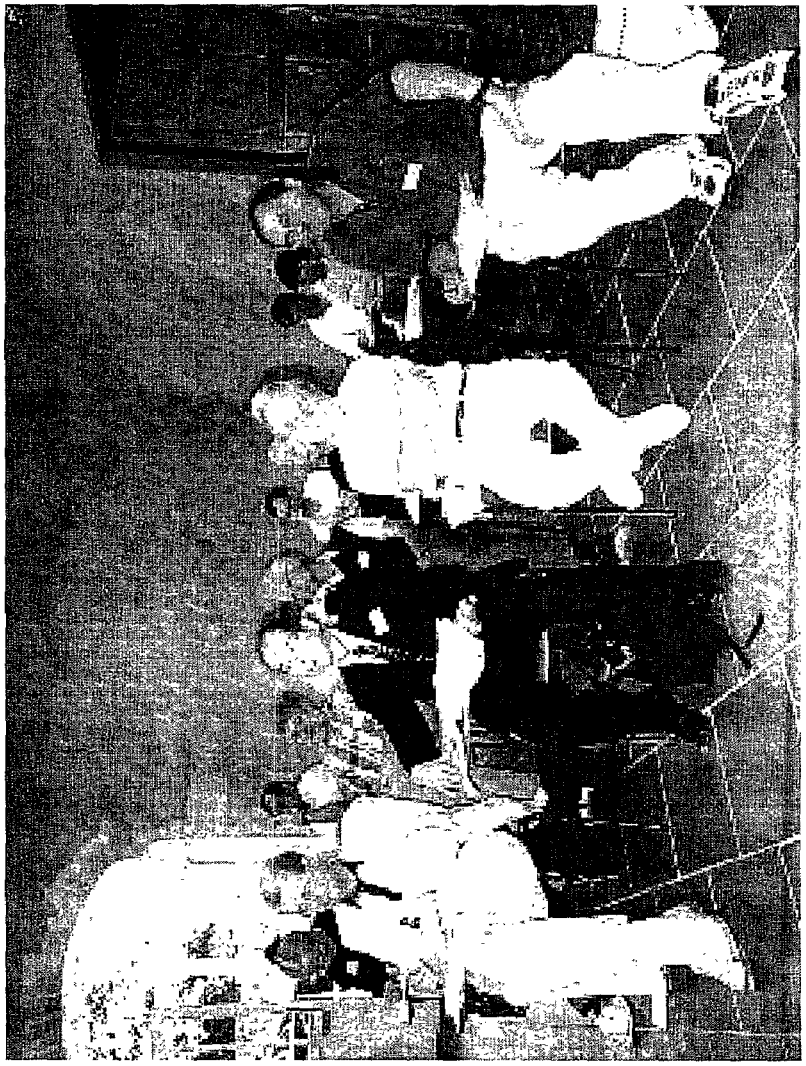

FIGS. 3–8 show the process of annotation of images aspects of electronic images with respect to an electronic photograph of four people at a conference. In FIG. 3, the initial state of an electronic photographic image is shown, along with a list of names of individuals that have previously been entered into the database due to their presence in other images of the library. In FIG. 4, the user selects an appropriate name from the presented list, and drags it into the photograph (FIG. 5). The annotation is "dropped" into the photograph at a location selected by the user (FIG. 6), thereby causing the software to display the annotated individual as one of the "People in the photograph." The process may be repeated to annotate additional people or other image aspects depicted in the image. FIG. 7 shows the annotation of four identified individuals. FIG. 8 shows an attribute of the software of the present invention to permit the "hiding" of annotations.

Figure 1:
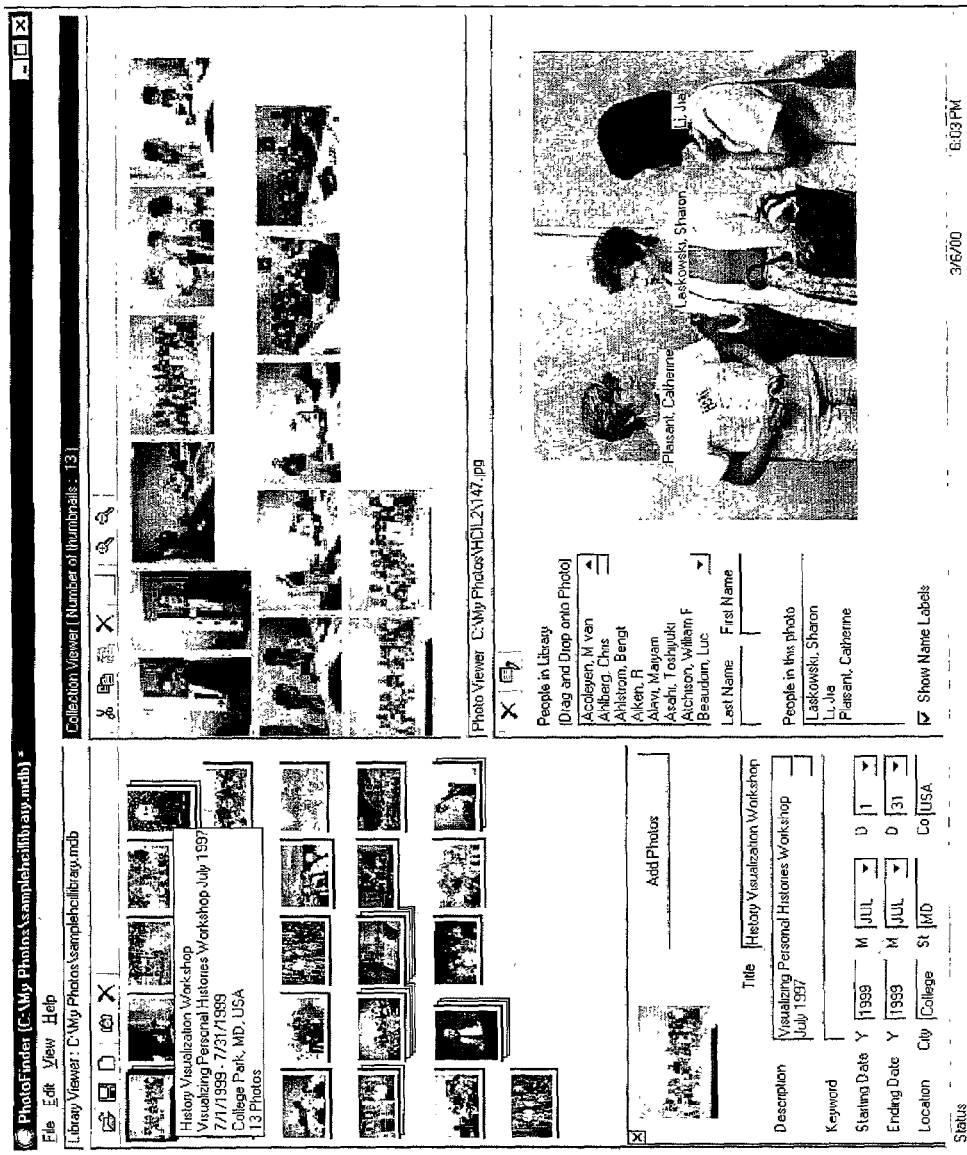
FIG. 1 illustrates the three windows of the user interface created by a preferred embodiment of the invention.

In FIGS. 3–8, the selection list is shown as being an alphabetically organized scrolling menu, but it could be implemented as a split, or nested menu (Andrew Sears and Ben Shneiderman, "Split Menus: Effectively Using Selection Frequency To Organize Menus", *ACM Transactions on Computer-Human Interaction* 1, 1, 27–51, 1994). In one embodiment, this would entail having 3–5 of the most commonly occurring names in a box, followed by the alphabetical presentation of the full list. Thus the most frequent names would be always visible to allow rapid selection. Alternatively, the names might be listed in hierarchical lists (e.g., family, co-workers, friends, etc.) that when selected would display either the entire set of names in the selected category, or 3–5 of the most commonly occurring names in a box, followed by the alphabetical presentation of the full list. Name completion strategies for rapid table navigation would be useful in this application. When users mouse down on a name, the dragging begins and a colored box surrounds the name. When users mouse up, the name label is fixed in place, a tone is sounded, and the database entry of the X, Y coordinates is stored. The tone gives further feedback and reinforces the sense of accomplishment. Further reinforcement for annotation can be given by subtly changing the border or other attribute of the image in an image Collection Viewer that is capable of showing a representative image of each image for each collection being viewed (FIG. 1). For example, when an image (e.g., a photograph) gets an annotation, the color of its thumbnail's border can be changed from white to green. Users will then be able to see how much they have accomplished and which images are still in need of annotation.

Also as shown in FIGS. 3–8, the user interface of a preferred embodiment of the software of the present invention displays a Show/Hide checkbox that gives users control over seeing the image with or without the image aspect annotations. Since the image is shown in a resizable window, the position of the labels changes upon resizing to make sure they remain over the same person. In a preferred embodiment, a small marker (e.g., ten pixels long) extends from the center of the label to allow precise placement of annotations when there many annotated image aspects are close together. The marker can be used to point, for example, at the head or body of depicted people, and is especially useful in annotating photographs of crowded groups.

In an alternative preferred embodiment, an automatic annotation mechanism is employed so that the users can just use a mouse to click, drag and drop to make annotations instead of repetitively typing in text fields. These techniques can be further combined with functionality for annotation of single photographs, groups of selected photographs, or entire collections of photographs.

Additional preferred embodiments of the software of the present invention include the capacity to resize the labels, change fonts, change colors, or add animations. Further embodiments permit collaborative annotation by multiple users working side-by-side (J. Stewart, B. B. Bederson, & A. Druin, "Single Display Groupware: A Model for Co-Present Collaboration.", *Proceedings of ACM CHI99 Conference on Human Factors in Computing Systems,* 286–293, 1999) or independently, to annotate images. The multiple annotations could then be combined, with appropriate resolution of conflicts. Tools for finding variant spellings or switches between last and first names could be optionally employed to raise data quality and uniformity. A valuable accelerator is bulk annotation (Allan Kuchinsky, Celine Pering, Michael L. Creech, Dennis Freeze, Bill Serra, Jacek Gwizdka, "Foto-File: A Consumer Multimedia Organization and Retrieval System", *Proceedings of ACM CHI99 Conference on Human Factors in Computing Systems,* 496–503, 1999), in which a group of photographs is selected and then the same label is applied to every photograph with one action, although individual placement might still be needed or desired.

Of course, annotation by names of people in photographs is only an illustration of the capability of the software of the present invention. Drag and drop annotation can be employed in accordance with the methods of the present invention for any kind of object in a photograph (e.g., car, house, bicycle, mountain, sunset, etc.), drawing, project (e.g., children's homework projects), or painting (brushstroke, signature, feature), etc. Annotation about the overall image, such as type of photograph (portrait, group, landscape), or painting (impressionist, abstract, portrait) can be added. The software can be used to indicate the importance or quality of the images (e.g., by annotating the images with colored ribbons, multiple star icons, etc.).

The Database Architecture of the Software of the Present Invention

Figure 2:
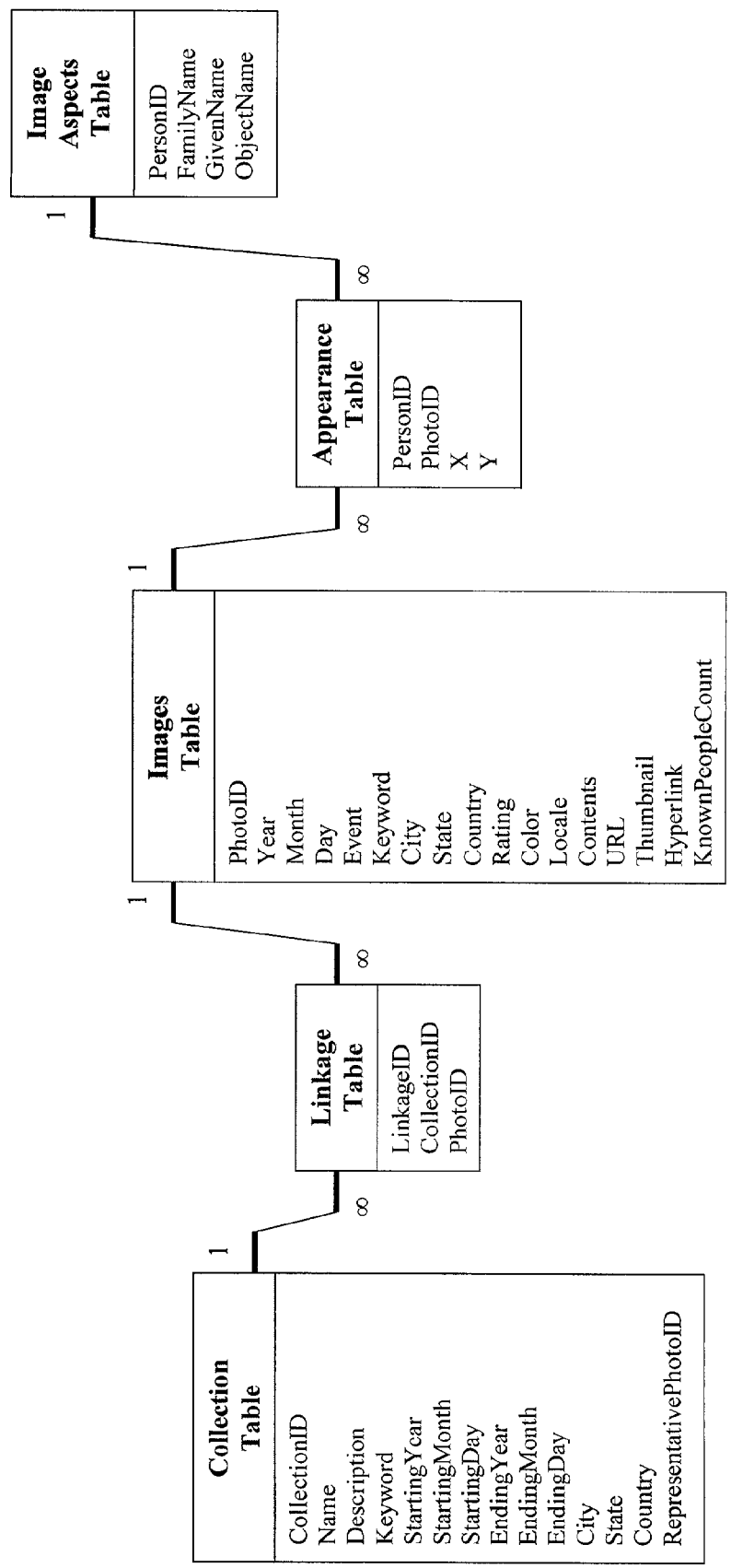
FIG. 2 illustrates the linkage relationships between the various Tables employed in a preferred embodiment of the software of the present invention.

In detail, the software of the present invention operates using an image library database. In a preferred embodiment, the software of the present invention is preferably implemented using Microsoft Visual Basic 6.0, however, other software (e.g., Java) may be used. Any database capable of linking tables may be employed. Preferably, the image library database is a Microsoft® Access® database that is able to link tables of image files with their associated annotations. In a preferred embodiment, the software of the present invention comprises an image library database that contains five linked tables (FIG. 2). Through ODBC, The software of the present invention is able to connect to and query the database. The basic concept is that an image library contains "Collections of Images," and that the images contain annotated image aspects. The various linked tables employed by the present invention are organized in an Image Library schema.

In the Image Library schema, the "Collections Table" represents the collections of images (photographs, drawings, etc.) with optionally provided attributes. Such attributes may include collection title, description, keywords, starting date, ending date, location, a representative PhotoID, a unique CollectionID, (either of which may be any set of alphanumeric or keyboard characters) etc. The "Images Table" is where references (full path and file name) of the images and their thumbnails are stored, optionally with important attributes such as the date upon which the photograph was taken (or image drawn), event, keywords, location, rating, color, locale, and so on. Each image should have a unique reference and images with the same references are preferably not allowed to be stored in this table even though they have different attribute values. The "Linkage Table" is the connection between the "Collections Table" and "Images Table". It stores the links between collections and images.

Information about the image aspects (for example, people, etc.) shown in the images of the Image Library is stored in an "Image Aspects Table". The attributes included in the Image Aspects Table may comprise, for example, the location of the scene depicted in the image, the name of geographical or political features depicted in the image (e.g., the Washington Monument; Mount Whittier), etc. Where the image aspect is a person, the attributes included in the Image Aspects Table may comprise, for example, the depicted person's Given (or First) name and Family (or Last) name, a unique PersonID (for example a social security number, student ID number, corporate employee number, or any set of alphanumeric or keyboard characters, etc.). Such a PersonID is desirable since it will facilitate the retrieval and storage of image aspects relating to people having the same first and last name (people having the same first and last name are preferably not allowed to be stored in Image Aspects Table).

The Image Aspects Table may optionally be extended to include personal or professional information such as initial impressions, reviews, reactions of others present when the image was made, e-mail addresses for exporting the Image Library to others, homepage addresses, resumes, occupations and so on. The "Appearance Table" stores the information about which image aspect is in which Image. It serves as the linkage between the Images Table and the Image Aspects Table. Possible attributes for this table include AppearanceID, PersonID, PhotoID, and relative (X, Y) coordinates (upper left corner is (0, 0), lower right is (100, 100)) of image aspects in the image.

The design of the Image Library preferably considers three major assumptions concerning the Library, its Collections, and its Images. These assumptions can be classified as follows (the present invention is illustrated using people depicted in electronic photographs as examples of image aspects of electronic images):

Relationship Between Collections and Images

A one-to-many relationship between the Collections Table and the Linkage Table is preferably set so that a collection can contain multiple images, and a one-to many relationship between the Images Table and the Linkage Table is preferably set so that same image can be included in multiple collections. It is also possible that a collection may contain the same image multiple times to permit its reappearances in a slide or other image presentation. Two collections may have exactly same set of images, may have overlapping sets of images, or may have non-overlapping sets of images. If two images have different path names, they are considered to be different images for the purposes of the present invention even though they are copies of one another.

Relationship Between Images and Image Aspects

A one-to-many relationship between the Images Table and the Appearance Table has been set so that an image can contain multiple image aspects (e.g., multiple persons), and a one-to-many relationship between Image Aspects Table and Appearance Table has been set so that same image aspect can be included in multiple images. Multiple appearances of the same image aspect in the same image is not allowed. For image aspects that are people, a composite pair of a Given name and a Family name should be unique in the Image Aspect Table.

Relationship Among Library, Collections, and Images

Within a library, the same image may be contained in multiple collections multiple times, but their attributes and annotations should be the same.

The software of the present invention may readily be expanded or altered to include additional or replacement tables, such as a "People Table" for providing information about depicted people, an "Object Table" for providing information about depicted objects, an "Animals Table" for providing information about depicted animals, a Keyword Table, and so on, along with connection tables similar to the Appearance Table. With such an Image Library database design, even more flexible annotation would be possible.

Figure 9:
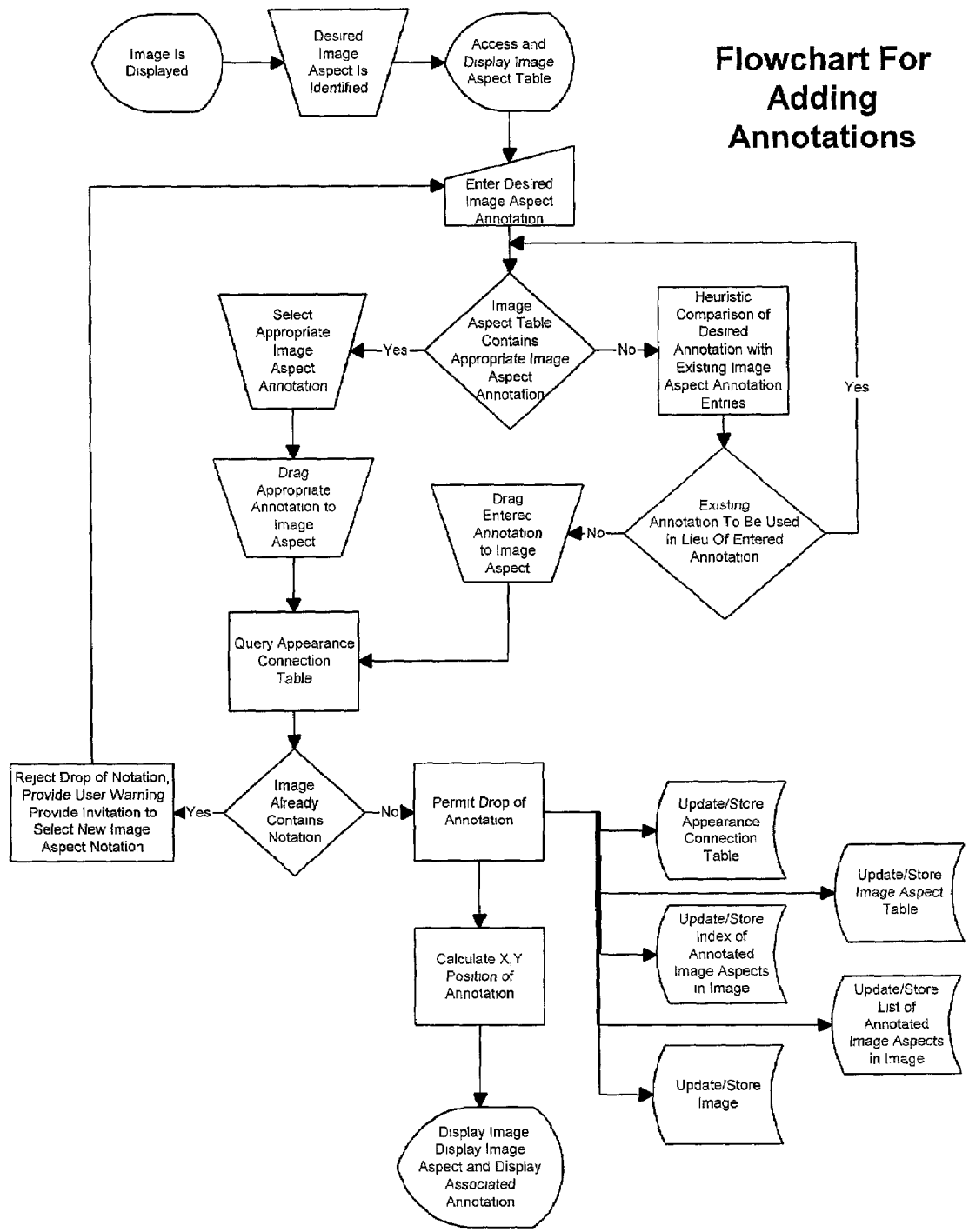
FIG. 9 is a flowchart of the general algorithm of software for accomplishing the direct annotation of electronic images.

The software of the present invention causes the Image Library database to be updated whenever the direct annotation module causes any information changes. To illustrate this attribute of software of the present invention, the Image Library database may be considered as comprising five categories. The corresponding algorithms and implementation issues involved in updating each such category are discussed below with respect to image aspects that are persons and in which the images are photographs. It will, however, be understood that such illustration is relevant to non-photographic images (such as drawings, sketches, etc.) and to image aspects other than people. FIG. 9 provides a flowchart of a preferred embodiment of the algorithm of the software of the present invention for accomplishing the direct annotation of electronic images.

Adding a New Name Label/Creating a New Person

When users drag a name from "People in Library" listbox and drop it onto a photograph, the software of the present invention checks to determine whether there already exists an Appearance connection between the photograph and the person since multiple appearances of the same person in a photograph are not allowed. If a conflict occurs, the software of the present invention signals such to the user (e.g., highlighting the existing name label on the photograph) and ignores the drag-and-drop event with a warning message. If there is no conflict, the software of the present invention finds the PersonID and PhotoID, calculates a relative (X, Y) position ($0 \leq X, Y \leq 100$) of the drag-and-drop point on the photograph, and then creates a new Appearance record with this information. After adding a new record to the Appearance table, the Software of the present invention updates the "People in this Photograph" listbox and finally creates a name label on the photograph. The software of the present invention signals to the user that the label has just been inserted (e.g., the newly added name in the "People in this Photograph" listbox will be selected, and accordingly the new name label on the photograph will be highlighted, etc.). If the added name label is the first one on the photograph, the software sends an event to the Collection Viewer to change the border color of the corresponding thumbnail (for example, to green) in order to show that the photograph now has an annotation.

The algorithm for creating a new person using the software of the present invention is simple. As soon as users type in the first name and last name of a person in the editbox and press enter, the software of the present invention checks to determine whether the name already exists in the People table. If so, a warning message will be displayed with the name in "People in Library" listbox being selected. If not, The software of the present invention creates and adds a new Person record to the People table, and then updates the "People in Library" listbox, selecting and highlighting the newly added name.

Deleting Name Label/Deleting Person

Figure 10:
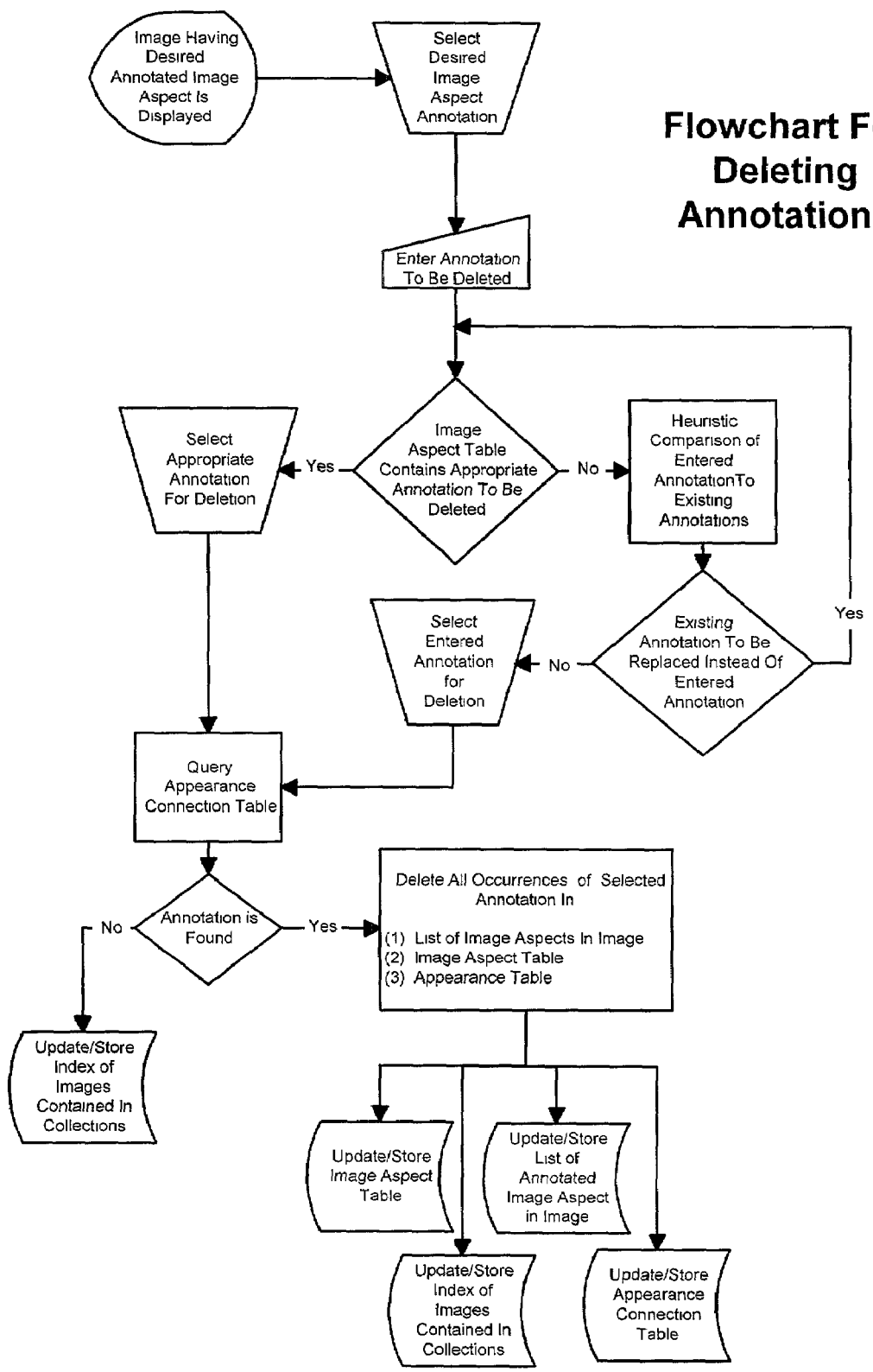
FIG. 10 is a flowchart of the general algorithm of software for accomplishing the deletion of annotations.

When the delete button of the software of the present invention toolbar is clicked or the delete key is pressed, the software checks to determine whether the selected name label already exists. If not, the software of the present invention ignores the deleting action. But if it does exist, the software automatically calculates the PersonID of the selected name label and the PhotoID, and it searches through the Appearance Table to find and delete an Appearance record having those IDs. The software of the present invention updates "People in this Photograph" listbox and deletes the name label on the photograph. If the deleted name label was the last one on the photograph, the software of the present invention sends an event to the Collection Viewer to change the border color of the corresponding thumbnail (e.g., to white), to show that the photograph has no annotation. If the user's focus is on the "People in Library" listbox and the delete key is pressed, The software of the present invention finds the PersonID of the selected name in the listbox. The software of the present invention deletes the PersonID from the People table and also deletes all the Appearance records containing that PersonID, which results in the complete elimination of the name label from the other photographs in the Photograph Library. Again, the Collection Viewer updates the 4border color of thumbnails that no longer have annotations. FIG. 10 provides a flowchart of a preferred embodiment of the algorithm of the software of the present invention for accomplishing the deletion of a direct annotation.

Editing a Name of Person

Figure 11:
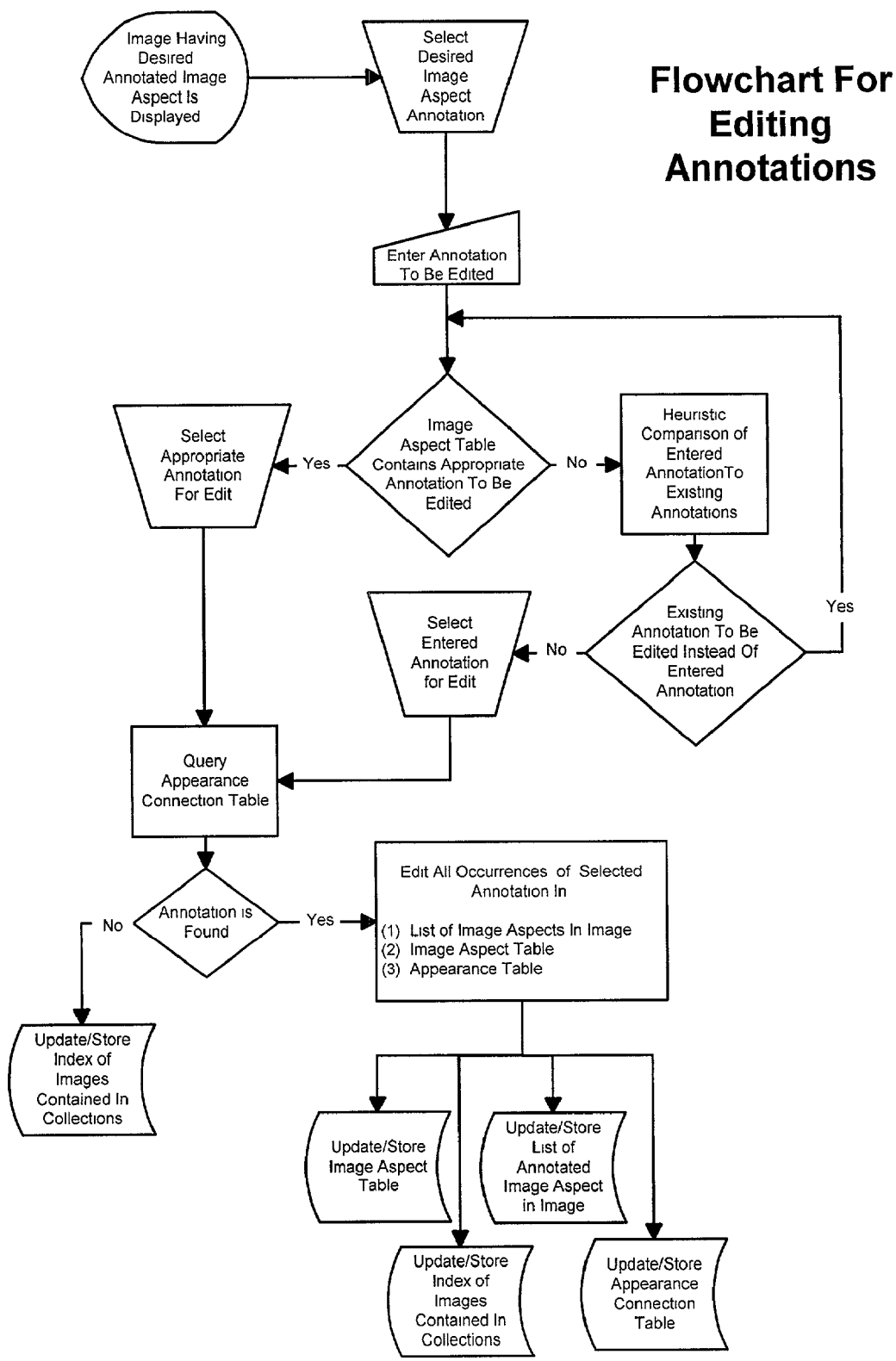
FIG. 11 is a flowchart of the general algorithm of software for accomplishing the editing of annotations.

Users of the software of the present invention can edit a name of person in library (e.g., by pressing the edit button of the Photo Viewer toolbar or by just double clicking over the selected name in the "People in Library" listbox). When the edited name is typed in, the software of the present invention finds and changes the corresponding person record from the People table only if there is no duplication of the name in the People table. It also refreshes both the "People in this Photograph" and the "People in Library" listboxes, and all the name labels on the current photograph. If duplication occurs, the whole editing process will be ignored with a warning message. FIG. 11 provides a flowchart of a preferred embodiment of the algorithm of the software of the present invention for accomplishing the editing of a direct annotation.

Positioning Name Label

The software of the present invention permits a user to change the position of a name label by drag-and-dropping the existing label over the photograph. As mentioned before, the X, Y position of the center point of a name label relative to its associated image aspect is stored in the corresponding Appearance record. Thus, if the image is resized, the X, Y position of the center point of the label is proportionately adjusted. In a preferred embodiment, the software of the present invention uses a small marker hanging down from the center of the label to allow precise placement. The size and direction (downward) of the marker is fixed, which may encumber efforts to distinguish labels when many people appear close together in a photograph. Using eccentric labels (Jean-Daniel Fekete Catherine Plaisant, "Excentric Labeling: Dynamic Neighborhood Labeling for Data Visualization.", *Proceedings of ACM CHI99 Conference on Human Factors in Computing Systems,* 512–519, 1999) or adding an additional (X, Y) field to the Appearance table to allow a longer and directional marker may be used in such circumstances. Alternatively, other features of the annotation may be changed, such as the font, font color, font highlighting, font size, justification, etc. and occlusion among labels in resizing the photograph may also be avoided.

Importing People (Image Aspects) Table from Other Libraries

Retyping the names that already exist in other libraries is very tedious and time-consuming job. Therefore, the software of the present invention supports a function to import the People (Image Aspects) Table from other libraries. The internal process of importing the People Table is similar to that of creating a new person repeatedly. The only thing the software of the present invention should handle is checking and eliminating the duplication of a person name.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth.

What is claimed is:

1. A computer software-mediated method for annotating a user-selected target image aspect contained within an electronic image that comprises a plurality of inherently unrelated image aspects, in which the placement of all desired image annotations is not determined solely by the scale of the image, and the X, Y coordinates of the image's center, wherein said inherently unrelated image aspects include a target image aspect and a non-target image aspect, said method comprising:
  (A) displaying said electronic image using a computer-generated display interface;
  (B) accessing and querying a searchable electronic list of annotation terms for a desired annotation term, and permitting a user to add or edit said desired annotation term to said database list;
  (C) associating said desired accessed or added or edited annotation term of said electronic list with said selected target image aspect of said electronic image, wherein said associating comprises positioning said desired annotation term at a user-selected location within the displayed electronic image to identify said selected target image aspect and distinguish it from a non-target image aspect contained within said electronic image, wherein said positioning is accomplished by selecting dragging and dropping said desired annotation term to said user-selected location;
  (D) storing said accessed or added or edited annotation term and said electronic image containing said target image aspect in a searchable electronic database of annotation terms and electronic images; and
  (E) permitting a subsequent user to display an electronic image (D) containing said selected target image aspect upon the querying of said electronic database (D) for said associated annotation term, wherein said displayed electronic image (D) optionally displays said annotation term positioned to identify the associated target image aspect and distinguish it from non-target image aspects contained within said displayed electronic image (D), and permitting said subsequent user to add, or edit; and store a desired annotation term to said database list and to associate said new desired annotation term with an image aspect of said displayed electronic image.

2. The computer software-mediated method of claim 1, wherein said computer is a personal computer having a screen, and wherein said displaying comprises displaying the displayed image on the screen of the personal computer.

3. The computer software-mediated method of claim 1, wherein said annotation is a textual annotation.

4. The computer software-mediated method of claim 1, further comprising selecting said image from the group consisting of a photograph, a writing, and a drawing.

5. The computer software-mediated method of claim 4, wherein said electronic image is a photograph.

6. The computer software-mediated method of claim 5, wherein said image aspect to be annotated is a person depicted in said photograph.

7. The computer software-mediated method of claim 6, wherein said annotation is a name of said person depicted in said photograph.

8. The computer software-mediated method of claim 1, that further permits the user to selectively hide and re-display the annotation term positioned within the electronic image.

9. A computer software-mediated method for retrieving and displaying an electronic image containing a target image aspect; wherein: said electronic image comprises a plurality of inherently unrelated image aspects, in which the placement of all desired image annotations is not determined solely by the scale of the image, and the X, Y coordinates of the image's center, wherein said inherently unrelated image aspects include a target image aspect and a non-target image aspect, and is stored in a database of electronic images and annotation terms,
  said target image aspect is associated with an annotation term of said database, said associated annotation terms being displayable positioned at a location within the displayed electronic image that identifies said selected target image aspect and distinguishes it from non-target image aspects contained within said electronic image, said method comprising:
    (A) accessing and querying said database of electronic images and annotation terms for electronic images containing a target image aspect associated with a queried annotation term;
    (B) retrieving from said database an electronic image identified through such querying that contains said target image aspect;
    (C) displaying said retrieved electronic image, wherein said retrieved image displays said queried annotation term positioned to identify the associated target image aspect and distinguish it from non-target image aspects contained within the displayed electronic image;
    (D) permitting a user to add or edit said desired annotation term to said database list;
    (E) storing said accessed or added or edited annotation term and said electronic image containing said target image aspect in a searchable electronic database of annotation terms and electronic images; and
    (F) permitting a subsequent user to display said electronic image (E) containing said selected target image aspect upon the querying of said electronic database (E) for said associated annotation term, wherein said displayed electronic image (E) optionally displays said annotation term positioned to identify the associated target image aspect and distinguish it from non-target image aspects contained within said displayed electronic image (E), and permitting said subsequent user to add, or edit, and store a new desired annotation term to said database list, and to associate said new desired annotation term with an image aspect of said displayed electronic image by selecting dragging and dropping said new desired annotation term to a user-selected location.

10. The computer software-mediated method of claim 9, wherein in said step (C), said image is displayed on the screen of a personal computer.

11. The computer software-mediated method of claim 9, wherein said annotation is a textual annotation.

12. The computer software-mediated method of claim 9, wherein said electronic image is selected from the group consisting of a photograph, a writing, and a drawing.

13. The computer software-mediated method of claim 12, wherein said electronic image is a photograph.

14. The computer software-mediated method of claim 13, wherein said desired image aspect is a person depicted in said photograph.

15. The computer software-mediated method of claim 14, wherein said annotation is a name of said person depicted in said photograph.

16. The computer software-mediated method of claim 9, that further permits the user to selectively hide and re-display the annotation term positioned within the electronic image.

17. A computer software-mediated method for retrieving and displaying electronic images containing related target image aspects, wherein:

said electronic images each comprise a plurality of inherently unrelated image aspects, in which the placement of all desired image annotations is not determined solely by the scale of the image, and the X, Y coordinates of the image's center, wherein said inherently unrelated image aspects include a target image aspect and a non-target image aspect, and are stored in a database of electronic images and annotation terms, said related target image aspects are each associated with at least one member of a family of related annotation terms of said database, each of said associated annotation terms being displayable positioned at a location within the displayed electronic image that identifies said selected target image aspect and distinguishes it from non-target image aspects contained within said electronic image, said method comprising:

(A) accessing and querying said database of electronic images and annotation terms for electronic images containing a target image aspect associated with any of said family of related annotation terms;

(B) retrieving from said database electronic images identified through such querying that contain a target image aspect;

(C) displaying a retrieved electronic image, wherein said retrieved image displays a queued annotation term positioned to identify the associated target image aspect and distinguish it from non-target image aspects contained within the displayed electronic image;

(D) permitting a user to add or edit said desired annotation term to said database list by selecting, dragging and dropping said desired annotation term to a user-selected location;

(E) storing said accessed or added or edited annotation terms and said electronic images containing said target image aspects in a searchable electronic database of annotation terms and electronic images; and (F) permitting a subsequent user to display said electronic images (D) containing said selected target image aspects upon the querying of said electronic database (D) for electronic images containing a target image aspect associated with any of said family of related annotation terms, wherein a displayed electronic image (D) optionally displays said annotation term positioned to identify the associated target image aspect and distinguish it from non-target image aspects contained within said displayed electronic image (D), and permitting said subsequent user to add, or edit; and store a new desired annotation term to said database list; and to associate said new desired annotation term with an image aspect of said displayed electronic image.

18. The computer software-mediated method of claim 17, wherein in said step (C), said image is displayed on the screen of a personal computer.

19. The computer software-mediated method of claim 17, wherein said annotation is a textual annotation.

20. The computer software-mediated method of claim 17, wherein said electronic image is selected from the group consisting of a photograph, a writing, and a drawing.

21. The computer software-mediated method of claim 20, wherein said electronic image is a photograph.

22. The computer software-mediated method of claim 21, wherein said desired image aspect is a person depicted in said photograph.

23. The computer software-mediated method of claim 22, wherein said annotation is a name of said person depicted in said photograph.

24. The computer software-mediated method of claim 17, that further permits the user to selectively hide and re-display the annotation term positioned within an electronic image.

25. A computer system specially adapted by software to store, retrieve and display an electronic image containing a target image aspect; wherein: said electronic image comprises a plurality of inherently unrelated image aspects, in which the placement of all desired image annotations is not determined solely by the scale of the image, and the X, Y coordinates of the image's center, wherein said inherently unrelated image aspects include a target image aspect and a non-target image aspect, and is stored in a database of electronic images and annotation terms, said target image aspect is associated with an annotation term of said database, said associated annotation terms being displayable positioned at a location within the displayed electronic image that identifies said selected target image aspect and distinguishes it from non-target image aspects contained within said electronic image, said computer system accomplishing the:

(A) accession and querying of said database of electronic images and annotation terms for electronic images containing a target image aspect associated with a queried annotation term upon the request of (B) retrieval from said database of an electronic image identified through such querying that contains said target image aspect;

(C) display of said retrieved electronic image, wherein said retrieved image displays said queried annotation term positioned to identify the associated target image aspect and distinguish it from non-target image aspects contained within the displayed electronic image;

(D) addition or editing of a desired annotation term to said database list by a user, and associating of a desired annotation term with an image aspect by selecting dragging and dropping said desired annotation term to a user-selected location in said electronic image;

(E) storage of said accessed or added or edited annotation term and said electronic image containing said target image aspect in a searchable electronic database of annotation terms and electronic images;

(F) display of said electronic image (E) containing said selected target image aspect to a subsequent user upon the querying of said electronic database (E) for said associated annotation term either alone or in combination with a different annotation term, wherein said displayed electronic image (E) optionally displays said annotation term positioned to identify the associated target image aspect and distinguish it from non-target image aspects contained within said displayed electronic image (E); and (G) addition or editing and storage of a new desired annotation term to said database list by a subsequent user, and the association of said new desired annotation term with an image aspect of said displayed electronic image.

26. The computer system of claim 25, wherein said annotation is a textual annotation.

* * * * *